Figure 1:
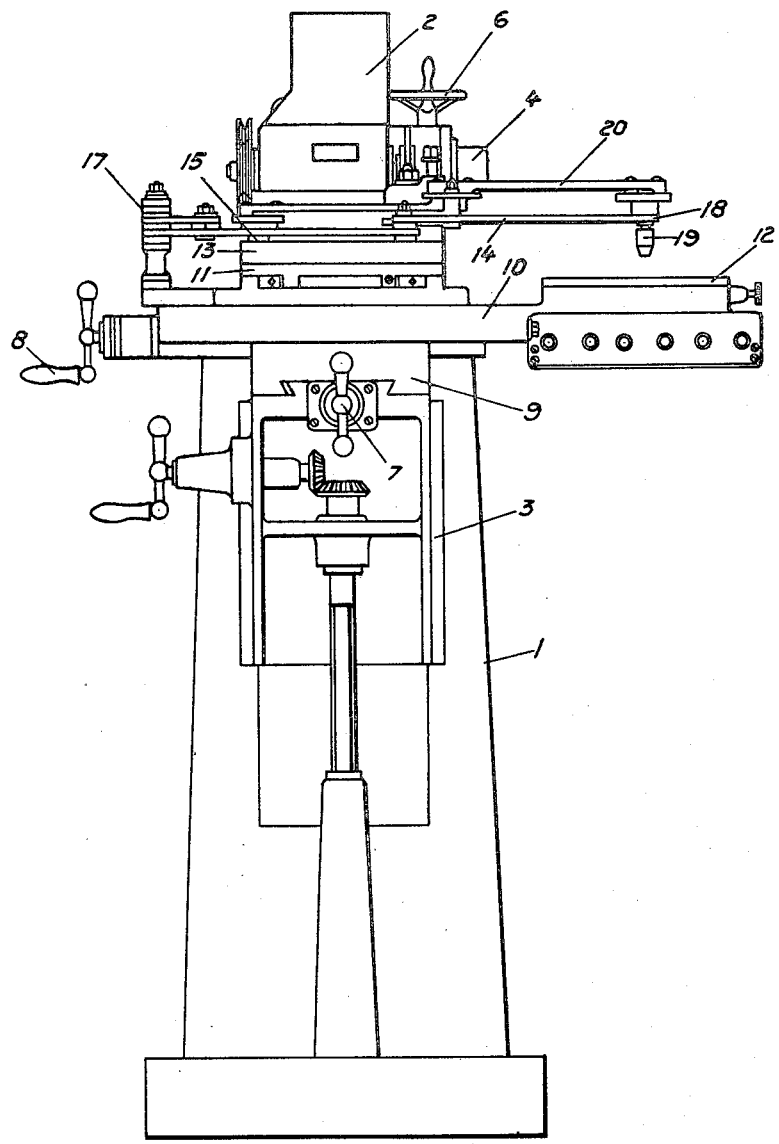

Sept. 12, 1950     E. A. ANGERBY ET AL     2,521,958
PROFILING GRINDER

Filed March 29, 1946                              3 Sheets-Sheet 1

INVENTORS
ERIK ARNE ANGERBY,
SVEN GUNNAR (CARLSSON) AXSÄTER
AND SVEN GERHARD BLOM

Sept. 12, 1950  E. A. ANGERBY ET AL  2,521,958
PROFILING GRINDER

Filed March 29, 1946  3 Sheets-Sheet 2

INVENTORS
ERIK ARNE ANGERBY,
SVEN GUNNAR (CARLSSON) AXSÄTER
AND SVEN GERHARD BLOM

INVENTORS
ERIK ARNE ANGERBY,
SVEN GUNNAR (CARLSSON) AXSÄTER
AND SVEN GERHARD BLOM

Patented Sept. 12, 1950

2,521,958

UNITED STATES PATENT OFFICE 2,521,958

PROFILING GRINDER

Erik Arne Angerby, Sven Gunnar Carlsson, and Sven Gerhard Blom, Nynashamn, Sweden; said Carlsson now by change of name Sven Gunnar (Carlsson) Axsäter Application March 29, 1946, Serial No. 658,242
In Sweden September 23, 1944

Section 1, Public Law 690, August 8, 1946
Patent expires September 23, 1964

4 Claims. (Cl. 51—100)

This invention relates to profiling grinders, e. g. for the shaping of tools, of the type wherein the movement of the work in relation to the grinding wheel in the horizontal plane is effected by means of a guide member arranged on a pantograph, said guide member being moved in the grinding operation along a template, whereby the said movement will be a reproduction preferably in a diminished scale of the movement of the said guide member.

Profiling grinders are previously known, in which the grinding wheel is connected to and supported by the pantograph so as to perform the copied path of movement, the support carrying the work having a reciprocating upward and downward movement imparted thereto. The support is adjustable to different angles in relation to its direction of movement, for instance to provide for a certain clearance angle of a tool.

Grinding machines of this type show a number of considerable drawbacks, however. Since the template is fixed on a table separate from the support, which is necessary owing to the reciprocating upward and downward movement of the support, the template calls for adjustment every time the support is shifted, so that the template is caused to take exactly the same inclination as the support so as to render the reproduction correct. It is obvious that a special adjusting operation of this kind complicates the use of the machine and may easily become a source of errors. An incorrect reproduction may also be produced on account of the thickness of the template when it is positioned obliquely to the guide member. Furthermore the pantograph calls for a complicated and expensive design so as to carry the grinding wheel without allowing the same to be subject to vibrations.

One object of the invention is to provide a combination in a profiling grinder, in which the adjustment for obtaining different clearance angles may be performed by a single manual operation.

Another object of the invention is to provide a combination in a profiling grinder, the essential parts of which are subject to a minimum of vibrations.

Still another object of the invention is to provide a combination in a profiling grinder, which facilitates the pre-adjustment of the work in relation to the grinding wheel and also makes possible the working of very long work pieces by utilizing the substructure carrying the support for the work and the template for receiving slideways to provide a cross-guided adjustment of the said substructure in relation to the grinding wheel.

Still another object of the invention is to provide a combination in a profiling grinder, in which the reproduction will be correct whatever is the form of the grinding wheel due to the use of parallel guiding means in connection with the guide member and of a guide member having a form corresponding to that of the grinding wheel.

Figure 2:
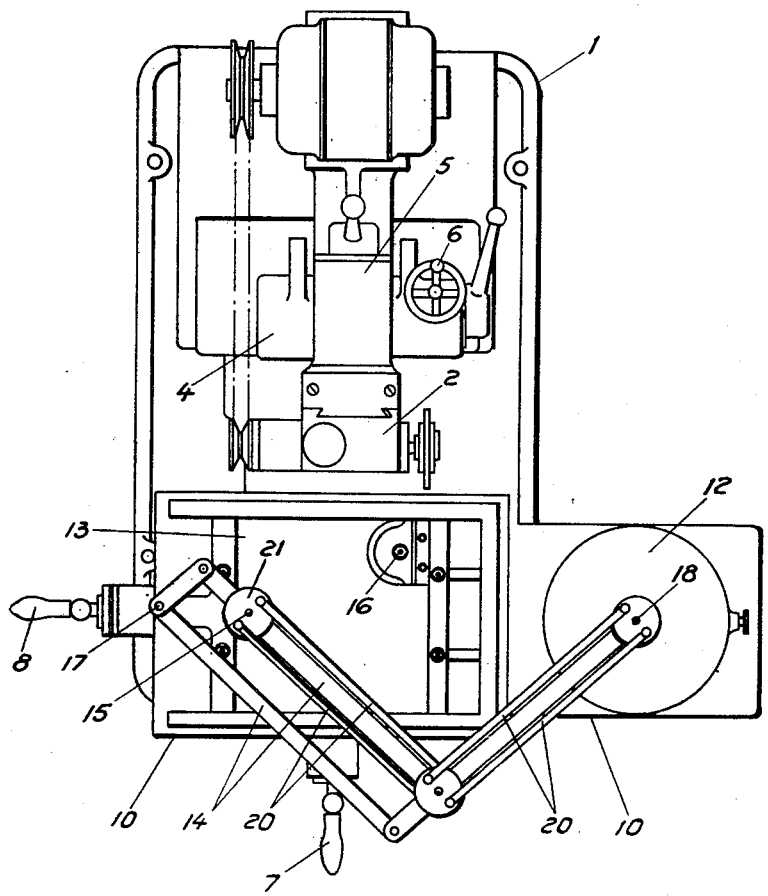
Figure 3:
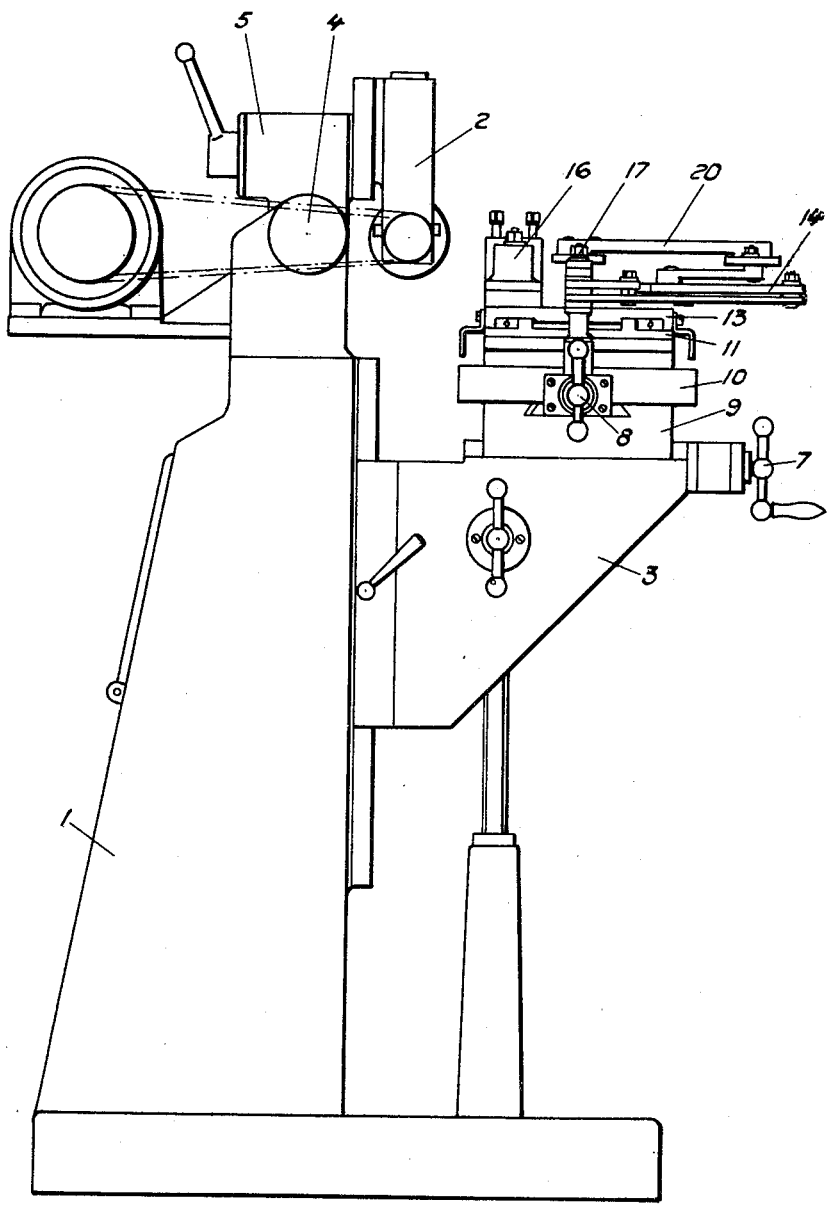

These and other objects, features and advantages of the present invention will appear from the attached description of a specific embodiment thereof illustrated in the accompanying drawings, in which:

Fig. 1 is a front elevation of the machine;
Fig. 2 is a plan of the same and,
Fig. 3 is a side elevation of the same.

Referring to the drawings:

The frame 1 of the grinding machine carries the grinding apparatus 2 adapted in known manner to perform a reciprocating upward and downward movement, and also supports a bench 3 adapted to be raised and lowered. The grinding apparatus 2 is rotatable about an axis parallelling the axis of the grinding disk, as at the joint 4, and about an axis extending at right angles thereto, as at the joint 5. The adjustment of the grinding apparatus about the joint 4 is effected with the aid of a control handwheel 6 adapted to actuate the joint 4 over a worm gearing.

The table 3, which is adapted to be raised and lowered, carries two slides 9 and 10 crossing one another and adjustable by means of control handwheels 7 and 8 respectively. The slide 10 is formed as a substructure for the lower slide 11 in a cross support, as well as for a table 12 rotatable in the horizontal plane and adapted to have the template secured thereto. The upper slide 13 in the cross support is connected with the pantograph 14 at a point 15, and is provided with a mandrel 16 for the securing of the work piece. The pantograph is mounted in the slide 10 at the point 17, which constitutes the fixed point of the system during the grinding operation. Provided at the free end 18 of the pantograph is a holder 19 for the guide member. The position of the point 15 is chosen so that it is caused at a movement of the guide member to perform a movement, the path of which is a diminished reproduction of the path of movement of the guide member. Consequently, when the guide member is moved, the slide 13 will perform a parallel movement owing to the cross guidance, which on a reduced scale agrees with the movement of the guide member. In order that a correct reproduction shall be obtained at an arbitrary shape of the grinding disk, it is necessary that the angle of the grinding disk to the outline of the work piece in the plane of the feeding movement be always the same as the angle of the guide member to the template, besides which the guide member shall have a cross section corresponding to the shape of the grinding disk and enlarged by the ratio of the pantograph in that portion thereof which may come into contact with the template. For this reason, the holder 19 is pivotally arranged in the pantograph and connected to a two-armed guiding parallelogram device 20, the other end of which is connected to a plate 21 arranged at the point 15 and rigidly connected with the slide 13. The guide member will thus always perform a parallel movement, the same as the slide 13, which latter guides the guide member in said movement. The arrangement functions and is manipulated substantially as follows:

For example, if a turning-tool is to be ground with a certain clearance angle, the grinding apparatus 2 is adjusted about the joint 4 to the desired angle relatively to the vertical axis. Here, no shifting whatever of the template table 12 is called for. The guide member held in the holder 19 is brought to bear on an initial point of the template, whereupon the turning-tool secured in the mandrel 16 is moved toward the grinding disk by turning of the handwheel 7, until the desired cutting degree is attained. When required, the turning-tool may also be preadjusted laterally by means of the handwheel 8, so that the initial point of the grinding disk on the turning-tool agrees with the starting point of the guide member on the template. Since the slide 10 constitutes a substructure both for the template and for the support guided by the pantograph, the template is thus brought along in the preadjustment, and consequently need not be adjusted individually. When the guide member is then moved along the template, the turning-tool is ground to the desired profile with a clearance angle determined by the inclination of the reciprocating movement of the grinding apparatus adjusted by means of the handwheel 6. To attain a certain desired angle of attack between the grinding disk and the work piece, counted in the horizontal plane, it is possible to position the work piece obliquely in the horizontal plane relatively to the grinding disk by turning the mandrel 16. Obviously, the template table 12 must then also be turned by the same angle.

What we claim is:

1. In a profiling grinder, the combination of a cross-support for carrying the work, a template, a template support, a guide member, a pantograph, one arm of which is connected to the said cross-support, and another arm of which is connected to the guide member, said pantograph being movable along the said template, a grinding wheel, a support for the grinding wheel including means for actuating the grinding wheel to move up and down, a further cross-support forming a base for the first mentioned cross-support as well as for the said template support, and adjusting means for actuating the slides of said further cross-support.

2. In a profiling grinder, the combination of a cross-support for carrying the work, a template, a template support, a guide member, a pantograph, one arm of which is connected to the said cross-support and another arm of which is connected to the guide member, said pantograph being movable along the said template, a grinding wheel, a support for the grinding wheel including means for actuating the grinding wheel to move up and down, a further cross-support forming a base for the first mentioned cross-support as well as for the said template support, adjusting means for actuating the slides of said further cross-support, a vertically slidable platform carrying the said further cross-support, and adjusting means for adjusting the altitude level of the said vertically slidable platform.

3. In a profiling grinder, the combination of a cross-support for carrying the work, a template, a template support, a guide member, a pantograph, one arm of which is connected to the said cross-support and another arm of which is connected to the guide member, said pantograph being movable along the said template, a grinding wheel, a support for the grinding wheel including means for actuating the grinding wheel to move up and down, a joint permitting said support for the grinding wheel to be adjusted in a desired angle to the vertical in the plane of the grinding wheel, adjusting means for adjusting the said angle, a further cross-support forming a base for the first mentioned cross-support as well as for the said template support, adjusting means for adjusting the slides of said further cross-support, a vertically slidable platform carrying the said further cross-support, and adjusting means for adjusting the altitude level of the said vertically slidable platform.

4. In a profiling grinder, the combination of a cross-support for carrying the work, a template, a template support, a guide member, a pantograph, one arm of which is connected to the said cross-support and another arm of which is connected to the guide member, said pantograph being movable along the said template, a grinding wheel, a support for the grinding wheel including means for actuating the grinding wheel to move up and down, a joint permitting said support for the grinding wheel to be adjusted in a desired angle to the vertical in the plane of the grinding wheel, a joint permitting said support for the grinding wheel to be adjusted in a desired angle to the vertical in a plane perpendicular to the plane of the grinding wheel, adjusting means for adjusting the said angles, a further cross-support forming a base for the first-mentioned cross-support as well as for the said template support, adjusting means for actuating the slides of said further cross-support, a vertically slidable platform carrying the said further cross-support, and adjusting means for adjusting the altitude level of the said vertically slidable platform.

ERIK ARNE ANGERBY.
SVEN GUNNAR CARLSSON.
SVEN GERHARD BLOM.

REFERENCES CITED

The following references are of record in the file of this patent:

UNITED STATES PATENTS

| Number | Name | Date |
|---|---|---|
| 2,179,388 | Taylor | Nov. 7, 1939 |

FOREIGN PATENTS

| Number | Country | Date |
|---|---|---|
| 463,767 | Great Britain | Apr. 6, 1937 |